Jan. 20, 1970            B. D. ANDREWS            3,490,611
GRAVITY-OPERATED MEANS FOR COLLECTING AND STACKING ARTICLES
Filed Dec. 4, 1967                                          2 Sheets-Sheet 1
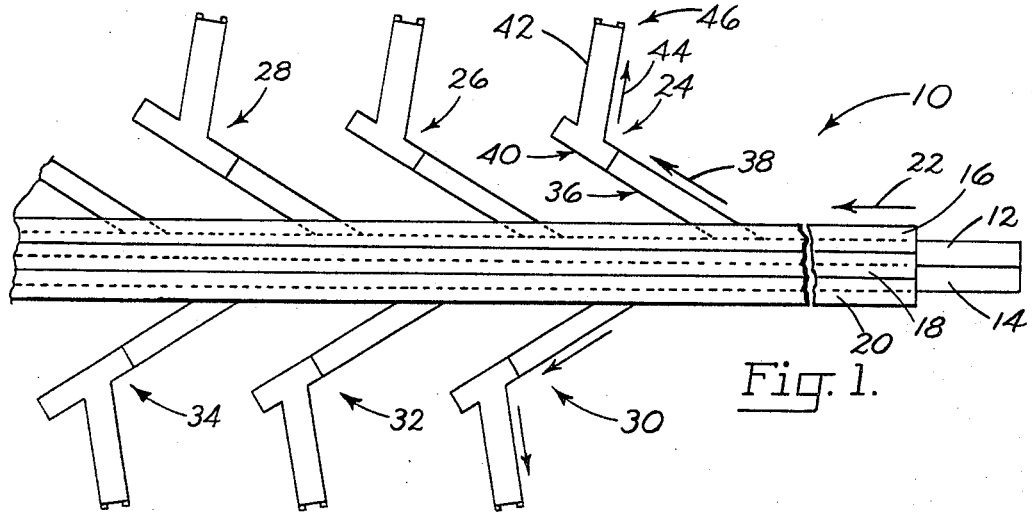
Fig. 1.
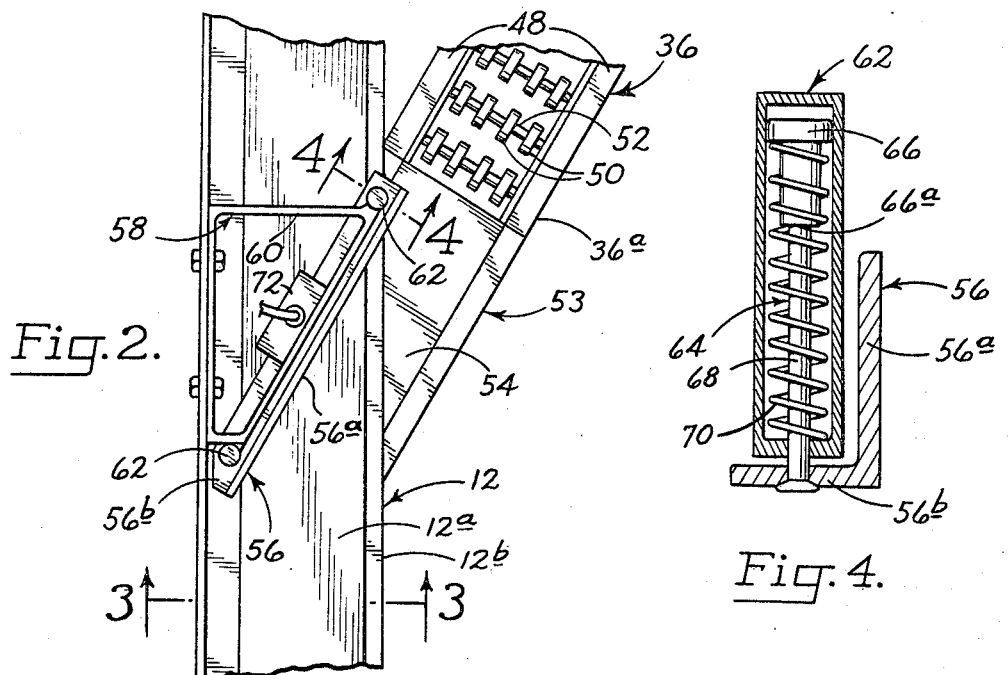
Fig. 2.
Fig. 3.
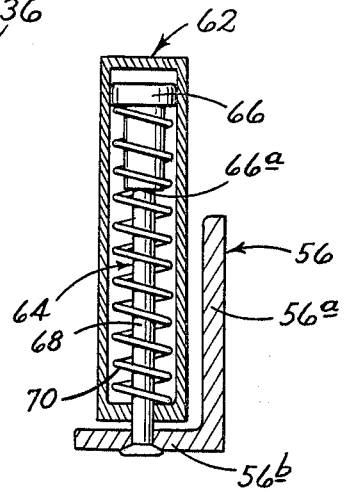
Fig. 4.
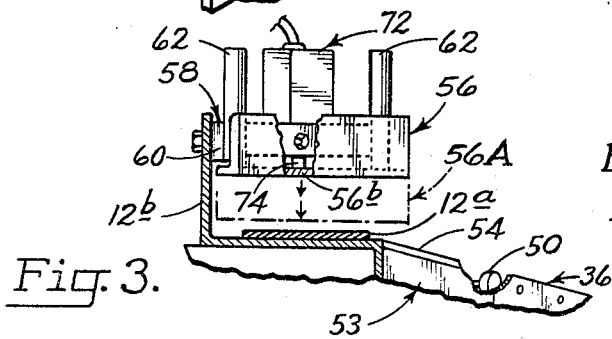
Benjamin D. Andrews
INVENTOR
BY Kolisch + Hartwell
Attys.

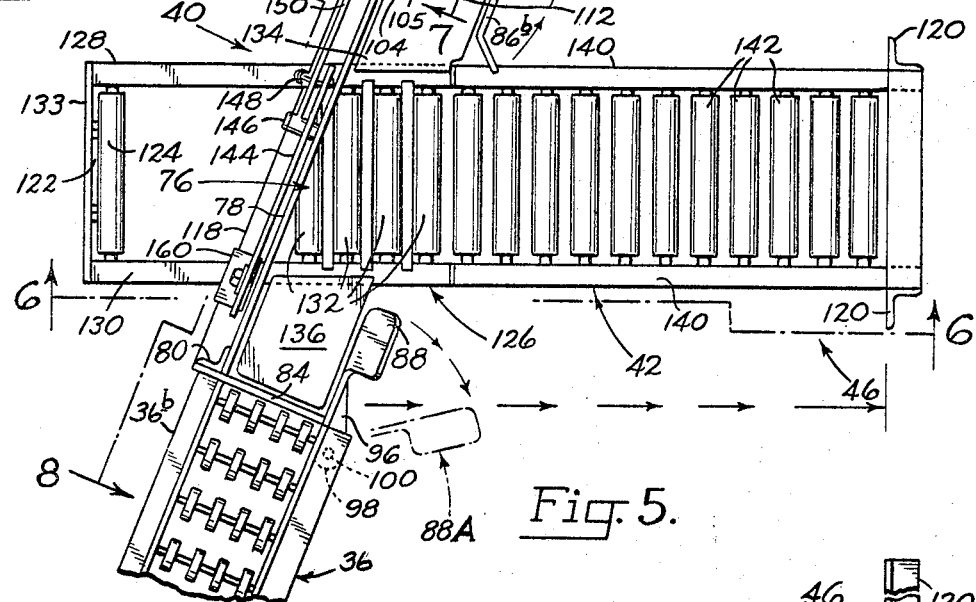
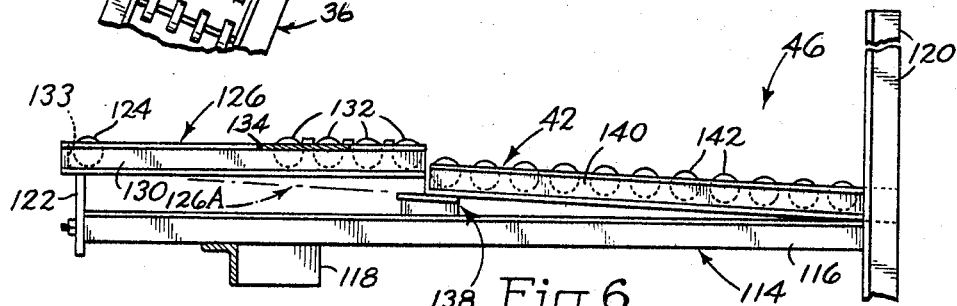
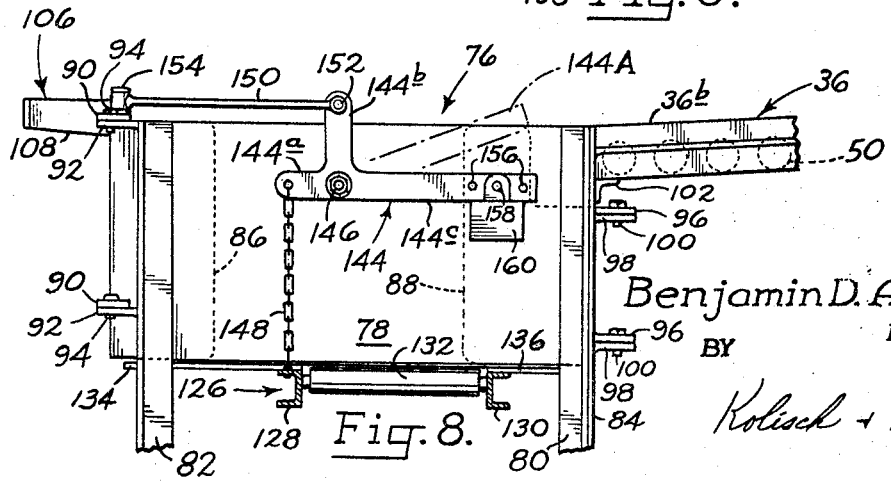

United States Patent Office 3,490,611
Patented Jan. 20, 1970

1

3,490,611
GRAVITY-OPERATED MEANS FOR COLLECTING
AND STACKING ARTICLES
Benjamin D. Andrews, Eugene, Oreg., assignor to Clear
Fir Products Co., Oreg., Ltd., a partnership, and Fibre-
board Corporation, doing business as Clear Fir Sales
Co., Springfield, Oreg.
Filed Dec. 4, 1967, Ser. No. 687,720
Int. Cl. B65g 15/22, 47/30
U.S. Cl. 214—6
14 Claims

ABSTRACT OF THE DISCLOSURE

Gravity-operated equipment for automatically collecting and stacking pieces of lumber diverted from a feed conveyer with formed stacks then automatically being fed to a receiving station to await further handling. The equipment includes a stack-forming enclosure, having an open top through which diverted lumber pieces are fed by gravity into the enclosure, and an element in the enclosure which effects opening of the enclosure and transfer of a stack out of the enclosure on a stack therein reaching a certain height. Such stack moves out of the enclosure under the influence of gravity.

---

This invention relates to apparatus for automatically collecting and stacking articles, such as pieces of lumber which are diverted from a main feed conveyor carrying such articles. Because of its particular utility in the field of lumber handling, a preferred embodiment of the invention is described herein in connection with a lumber sorter.

In a sawmill operation today, it has become increasingly important, because of limited supply, to cut lumber to obtain maximum yield rather than to obtain particular sizes. To further explain, lumber now often is cut to remove only inferior parts, with the remaining good parts, of whatever size, saved and used.

When cutting for yield, boards obtained will vary considerably both with respect to width and length. Thus, if equipment for sorting, stacking and collecting such boards is to perform adequately, it must be provided with a relatively large number of sorting and stacking stations to accommodate the differently sized boards. Obviously, if sorting and stacking of so many different sizes of boards is to be done economically, with the large number of stations required, it is important to minimize the construction and operating costs of such stations. Thus, it is desirable to minimize the amount of power-operated equipment employed in a station, since such equipment is a major contributor to high costs.

A general object of the present invention, therefore, is to provide, in apparatus including a fed conyevor which carries articles such as lumber pieces that are to be collected, stacked and stored, novel means for receiving articles diverted from the conveyer, which automatically collects and stacks the articles, and delivers formed stacks to a receiving station to await further handling.

More specifically, an object of the invention is to provide such means producing stacking and collecting of formed stacks which may be, to a large extent, gravity operated.

Thus, and considering the formation of a stack, the invention features a novel stack enclosure with an open top and walls distributed about a space for snugly enclosing a stack, a diverting member operable to engage and shift a lumber piece traveling on the feed conveyer to one side of the fed conveyer, and a diverting conveyer extending from the feed conveyer downwardly at an angle toward the open top of the stack enclosure for transporting by gravity successive pieces of lumber shifted by the diverting member, and for introducing such pieces into the enclosure through its open top. Boards or lumber pieces thus introduced into the enclosure collect on top of one another to form a stack.

The invention also features novel means for sensing when a stack in the enclosure has reached a certain height, and then permitting the action of gravity on the stack to effect a release of the stack from the enclosure.

More specifically, the invention includes a novel swing wall in the enclosure which may be swung to open a side of the enclosure, a gravity operated conveyer section operatively connected to the swing wall having a raised position in which it forms a base for the enclosure, and movable by gravity under the influence of a stack supported thereby to a lowered, inclined position producing travel of the stack away from the enclosure. Also included is means releasably locking the swing wall in a position closing the side of the enclosure, with the conveyer section then held in a raised position, and a stack height-sensitive element which actuates the locking means to release the swing wall and conveyer section on the stack in the enclosure reaching the above-mentioned certain height.

Upon lowering of the conveyer section, and swinging of the swing wall to open the side of the enclosure, the stack travels by gravity laterally away from the enclosure onto a receiving conveyer which transports it by gravity to a receiving station adapted to hold multiple stacks.

These and other objects and advantages attained by the invention will become more fully apparent as the description which follows is read in conjunction with the accompanying drawings, wherein:

FIG. 1 is a simplified, fragmentary, plan view, illustrating a lumber sorter employing collecting and stacking means constructed according to the invention;

FIG. 2 is a fragmentary plan view, on a larger scale than FIG. 1, illustrating a diverting means employed in the sorter of FIG. 1;

FIG. 3 is a cross-sectional view, on the same scale as FIG. 2, taken along the line 3—3 in FIG. 2;

FIG. 4 is a cross-sectional view, on a larger scale than FIGS. 2 and 3, taken along the line 4—4 in FIG. 2;

FIG. 5 is a fragmentary plan view, on the same scale as FIGS. 2 and 3, illustrating a stack-forming means, a receiving conveyer, and a receiving station associated with the diverting means of FIGS. 2 and 3;

FIG. 6 is a view taken along the line 6—6 in FIG. 5, with portions of the stack-forming means removed;

FIG. 7 is a cross-sectional view taken along the line 7—7 in FIG. 5; and

FIG. 8 is a view taken along the line 8—8 in FIG. 5.

Turning now to the drawings, and referring first to FIG. 1, indicated generally at 10 is a lumber sorter for sorting boards according to length. Sorter 10 includes five elongated, horizontal, power-driven feed conveyers, indicated at 12, 14, 16, 18, 20. These receive boards at their infeed ends (their right ends in FIG. 1) and transport such boards in the direction of arrow 22. Conveyers 16, 18, 20 are disposed above conveyers 12, 14. The various feed conveyers are similar in construction, and considering conveyer 12 (as further illustrated in FIG. 2), it includes a traveling flexible belt 12a supported on support structure 12b.

In practice, boards of different lengths may be pre-sorted according to some characteristic other than length, for example grade, and the different types of such pre-sorted boards are fed endo to different ones of the feed conveyer.

Extending at oblique angles from a side of each feed conveyer are sorting branches, such as those shown generally at 24, 26, 28 extending from conveyer 12, and those shown at 30, 32, 34 extending from conveyer 20, for collecting, stacking, and storing formed stacks of boards diverted from the feed conveyer. The manner in which boards are diverted into selected ones of these branches, and the details of construction of such branches will be explained more fully in a latter discussion. Each sorting branch for a given conveyer handles a different size of board. Thus, and considering conveyer 12, branch 24 may handle long boards, branch 26 somewhat shorter boards, and branch 28 boards of an even shorter length.

Except for the fact that certain dimensional differences may exist between the different sorting branches, the various branches are substantially the same in construction. Thus, and considering branch 24 as shown in FIG. 1, in general terms it includes a diverting conveyor 36 which receives boards diverted from feed conveyer 12 and transports such boards in the direction of arrow 38. The organization also includes a stack-forming means 40 wherein successive boards traveling on conveyer 36 collect and form into a stack, a receiving conveyer 42 which receives formed stacks from enclosure 40 and transports such stacks away from the enclosure in the direction of arrow 44, and a receiving station 46 for receiving and holding multiple formed stacks.

Diverting conveyer 36 (refer now to FIGS. 2, 3, and 4) includes a pair of laterally spaced, elongated, parallel side members 48 forming a frame for the conveyer, and plural nonpowered skate rollers, such as rollers 50 journaled on shafts 52. The infeed end of conveyer 36 (shown at 36a) is joined to support structure 12b through framework 53 supporting an apron 54. As shown in FIG. 2, the longitudinal axis of conveyer 36 is disposed at an oblique angle to that of conveyer 12; and as can be seen in FIG. 3, conveyer 36, and the upper face of apron 54, slope downwardly away from conveyer 12.

Also forming part of the means by which boards are diverted from the feed conveyer is an elongated diverting member 56 disposed over the feed conveyer. Such may take the form of an angle iron having an upright flange 56a and a horizontal flange 56b. As can be seen in FIG. 2, member 56 is positioned with its longitudinal axis substantially paralleling that of conveyer 36.

Member 56 is supported for vertical movement toward and away from the top of belt 12a on a mount 58 which is suitably anchored to support structure 12b. More specifically, mount 58 includes a frame 60, and a pair of spaced cylinders 62 mounted thereon. Referring to FIG. 4, each cylinder contains a vertically movable, relatively shiftable piston, such as piston 64. The pistons include piston heads, such as piston head 66, slidably received within the cylinder, and a piston rod, such as rod 68, joined to the head and projecting through the lower end of the cylinder. The piston head includes a downwardly facing shoulder 66a which, on downward movement of the piston relative to the cylinder, engages the base of the cylinder to limit such movement. The lower end of each piston rod is suitably fastened to flange 56b in the diverting member.

A biasing spring, such as spring 70, is provided inside each cylinder with the upper end of the spring acting against the lower side of the piston head in the cylinder, and the lower end of the spring acting against the base of the cylinder. The biasing springs act on the pistons, and bias the diverting member to the raised position in which it is shown in solid outline, where it is spaced a considerable distance above the top of belt 12a. With the diverting member in this position, sufficient clearance is provided between the base of member 58 and the top of the belt to permit unimpeded travel of a board traveling on the belt.

Suitably secured to mount 58 at a point intermediate cylinders 62 and directly over flange 56b, is an electrical solenoid 72. The solenoid includes an elongated, vertically disposed, movable plunger 74 (FIG. 3) having its lower end suitably fastened to flange 56b. When the solenoid is energized, plunger 74 moves member 56 downwardly against the bias exerted by biasing springs 70 to the position shown for the member in dash-dot outline at 56A in FIG. 3.

Solenoid 72 may be selectively energized by means of conventional board length-sensing apparatus (not shown) spaced toward the infeed end of conveyer 12 from member 56 which monitors the lengths of lumber pieces traveling on the conveyer. Whenever a board having a specified length travels past the sensing apparatus, the latter energizes solenoid 72 causing member 56 to shift downwardly toward belt 12b. The diverting member stops short of the belt, however, with previously-mentioned shoulders 66a engaging the bases in cylinders 62. A short time later, solenoid 72 again becomes deenergized, and springs 70 return member 56 to its raised position. Lumber pieces traveling on conveyer 12, and having lengths other than such specified lengths do not produce energizing of solenoid 72.

Considering now the construction of stack-forming means 40, and referring to FIGS. 5 and 8, indicated generally at 76 is an open-topped stack enclosure which, when viewed from above (as in FIG. 5), has an elongated, rectangular outline. Forming walls in the enclosure bounding a space for receiving lumber pieces are an upright plate 78 anchored to a pair of spaced upright support posts 80, 82, an upright plate 84 suitably anchored to post 80 and occupying a plane disposed at a right angle to the plane of plate 78, and a pair of upright swing walls 86, 88.

Swing wall 86, when occupying the position where it is shown in solid outline in FIG. 5, has a portion 86a extending across and closing off the end of the enclosure opposite plate 84, and a portion 86b extending across and partially closing off the side of the enclosure opposite plate 78. Wall 86 is mounted for swinging movement about an upright axis by means of a pair of vertically spaced arms 90 suitably anchored to part 86a in the wall, a pair of vertically spaced brackets 92 fastened to post 82, and a pair of pivot connections 94 pivoting the arms to the brackets. Swing wall 86 may be swung to the position shown in dash-dot outline at 86A to open the side of the enclosure opposite plate 78.

Swing wall 88 is mounted for swinging about an upright axis by means of a pair of vertically spaced arms 96 fastened to the wall, a pair of vertically spaced brackets 98 anchored to the outer face of wall 84, and a pair of pivot connections 100 pivoting arms 96 to brackets 98. Wall 88 is normally held in its solid outline position in FIG. 5 by means of a concealed biasing spring, and in this position it extends across and partially closes off the side of enclosure 76 opposite plate 78. The wall may be swung to the position where it is shown in dash-dot outline at 88A to open this side of the enclosure.

As can be seen clearly in FIG. 8, the offbearing end 36b of diverting conveyor 36 is positioned adjacent the open top of the enclosure, and is supported on a bracket 102 suitably fastened to post 80 and to plate 84. Referring to FIG. 5, the diverting conveyer and stack enclosure are so positioned that, when viewed from above, their longitudinal axes are substantially in line with one another.

Further describing stack-forming means 40, and referring now to FIGS. 5, 7, and 8, suitably joined to the inner face of plate 78 adjacent swing wall 86, and projecting into the enclosure, is a bracket 104. Mounted on bracket 104 at 105 for pivotal movement about a horizontal axis extending transversely of the longitudinal axis of the enclosure is an elongated arm, or releasable locking means, 106. The arm includes an outwardly projecting curved end part 106a and a depending part 106b. The under surface of part 106a includes an edge, or guide, 108 terminating in a notch 110 spaced inwardly from the outer end of part 106a. Mounted on the depending part of the arm is a plate 112 constituting a height-sensitive element, or size-responsive means.

With swing wall 86 in its solid outline position, its upper edge is received and caught in notch 110, as can be seen in FIG. 7. With this the case, the wall is prevented from swinging. However, with arm 106 and plate 112 swung to their dash-dot outline positions in FIG. 7, the upper edge of wall 86 is clear of notch 110, and the wall is free to swing.

Considering now particularly FIGS. 5 and 6, disposed with its longitudinal axis at an oblique angle to the longitudinal axis of enclosure 76, as the same is viewed from above, and positioned beneath the enclosure, is an elongated horizontal frame 114 (FIG. 6). Frame 114 includes a pair of laterally-spaced side members, such as side member 116, suitably joined together adjacent their opposite sets of ends. The part of frame 114 extending beneath enclosure 76 is supported by an angle iron 118 extending between and joined to the posts 80, 82. The right side of the frame in FIGS. 5 and 6 is supported by a pair of spaced upright posts 120 which project above the top of the frame on opposite sides thereof.

Suitably secured to the left end of frame 114 in FIGS. 5 and 6 is an upright plate 122 which projects above the top of the frame. Mounted on plate 122 through a hinge 124 spaced above the top surface of frame 114 is an elongated conveyer section 126 having a longitudinal axis which, when viewed from above, substantially parallels that of frame 114. Conveyer section 126 also comprises part of stack-forming means 40. Hinge connection 124 permits swinging of the conveyer section about a horizontal axis which extends transversely of the longitudinal axis of the conveyer section.

Conveyer section 126 includes a pair of laterally-spaced side members 128, 130 forming a frame for the conveyer section, and nonpowered rollers 132 extending between and journaled on the side members adjacent the side members' right ends in FIGS. 5 and 6. The left set of ends of members 128, 130 in these figures are joined by a crossbar 133. As can be seen in FIG. 5, rollers 132 directly underlie enclosure 76. Suitably joined to side members 128, 130 at the locations shown are outwardly projecting plates 134, 136, respectively, having the peripheral outlines indicated.

The conveyer section is shown in solid outline in what is called its raised position, where the tops of rollers 132 lie in a substantially horizontal plane. In its raised position, the conveyer section forms the base of enclosure 76. In dash-dot outline at 126A in FIG. 6, the conveyer section is shown in a lowered position, where it is supported by a platform 138 mounted on frame 114. When in its lowered position, the tops of rollers 132 lie in a plane that slopes downwardly progressing to the right in FIG. 6.

Also mounted on frame 114 is previously-mentioned receiving conveyer 42. This conveyer includes a pair of laterally-spaced parallel side members 140 forming a frame for the conveyer, and nonpowered rollers 142 extending between and journaled on, and spaced along the lengths of, the side members. Referring to FIG. 6, conveyer 42 slopes downwardly from left to right in the figure, with the left end of the conveyer mounted on platform 138, and the right end of the conveyer mounted on the right ends of frame members 140. With conveyer section 126 in its lowered position, the tops of rollers 142 lie in the same inclined plane as that occupied by the tops of rollers 132.

Referring now to FIGS. 5 and 8, means is provided according to the invention interconnecting conveyer section 126 and swing wall 86 whereby the two operate interdependently. Such means includes a crank 144 mounted on the outside of plate 78 through a pivot connection 146. The crank includes arms 144a, 144b, 144c. Arm 144a is connected to member 128 in conveyer section 126 through a chain 148. Arm 144b is connected to the upper one of arms 90 by an elongated bar 150 having one end pivoted at 152 to arm 144b and the other end pivoted at 154 to arm 90. Adjacent its outer extremity arm 144c is provided with plural bores, such as bores 156, spaced longitudinally on the arm. Mounted on arm 144c through a connector 158 connecting with one of bores 156 is a weight, or gravity-biased means, 160. The provision of plural bores in the arm permits adjustment of the position of weight 160 where adjustment may be desired to accommodate different operating conditions.

Describing now how organization 24 performs in sorter 10, let us assume that enclosure 76 initially is empty, and that swing walls 86, 88, arm 106, plate 112, conveyer section 126 and crank 144 initially occupy the positions in which they are shown in solid outline in the drawings. When a lumber piece traveling on conveyer belt 12a produces energizing of solenoid 72, diverting member 56 shifts downwardly toward the belt to engage the lumber piece and divert it onto apron 54, with the longitudinal axis of the piece becoming aligned with that of diverting conveyer 36. Through such action of member 56, and because of the speed which the lumber piece has, it travels by momentum onto rollers 50 in the diverting conveyer. Solenoid 72 then becomes deenergized, and member 56 returns to its raised position.

The inclination of conveyer 36 is such that the action of gravity on the lumber piece is sufficient to cause it to travel on rollers 50 along the length of the conveyer. As the lumber piece travels to the discharge end of conveyer 36, it falls by gravity into enclosure 76 where it is brought to rest and held on conveyer section 126. Such operation continues for successive pieces shifted onto conveyer 36 with such pieces collecting one on top of another inside the enclosure to form a stack. During formation of a stack, because the upper edge of swing wall 86 is caught in notch 110, which inhibits movement of the swing wall, and because the swing wall is connected through bar 150, crank 144 and chain 148 to conveyer section 126, the latter is held in its raised position.

However, upon a stack in the enclosure reaching a certain height, a piece of lumber traveling into the enclosure strikes plate 112 causing arm 106 to shift to its dash-dot outline position in FIG. 7. This frees the upper edge of the swing wall from notch 110. When this occurs, the action of gravity on the stack causes the conveyer section to swing downwardly to its lowered position. Such swinging of the conveyor section causes crank 144 to swing to the position where it is shown in dash-dot outline at 144A in FIG. 8 and such crank movement, through the action of bar 150, causes swing wall 86 to shift to the position where it is shown in dash-dot outline in FIG. 5. Thus, wall 86 shifts to a position opening the side of the enclosure facing receiving conveyor 42.

With the conveyer section lowered and inclined downwardly toward receiving conveyer 42, and with swing wall 86 thus swung aside, the stack moves by gravity out of the enclosure onto conveyer 42. During such movement, the stack engages swing wall 88, and shifts the wall to position 88A shown in FIG. 5. Once supported on receiving conveyer 42, the stack continues to travel by gravity toward receiving station 46 and posts 120 where it is brought to rest.

Because the longitudinal axes of conveyor section 126 and enclosure 76 are disposed at an oblique angle relative to one another, a substantial part of the base of the stack is supported by rollers 132, and this is important in stabilizing a stack as such begins to move out of the enclosure. In addition, such construction permits receiving station 46 to be well spaced to a side of conveyer 12 to provide good access for further handling of a stack.

With the stack completely clear of conveyer section 126 and walls 86, 88, weight 160, acting through crank 144, chain 148 and bar 150, causes the conveyer section and swing wall 86 to move back to the positions which they had during formation of the stack. The biasing spring acting on swing wall 88 returns it to the position which it had.

It should be noted that during movement of swing wall 86 between the two positions in which it is shown in FIG. 5, the upper edge of part 86a in the wall continuously engages edge 108 in arm 106. Thus, as the swing wall returns to its solid outline position after a stack has moved away from the enclosure, arm 106 is guided to a position where notch 110 again engages the top edge of the swing wall.

Such operation of organization 24 then continues, with additional stacks of lumber pieces being formed in enclosure 76, and transferred to receiving station 46 where they are held for further handling. Station 46 in the apparatus shown can accommodate several stacks. The other collecting and stacking organizations perform in a similar manner.

While a preferred embodiment of the invention has been described herein, it is appreciated that variations and modifications may be made without departing from the spirit of the invention.

It is claimed and desired to secure by Letters Patent:

1. In apparatus for conveying and stacking lumber pieces and the like including a power-driven feed conveyer, means for diverting lumber pieces carried by said feed conveyer to one side of the feed conveyer, with such pieces moved toward said one side under the influence of the feed conveyer, a nonpowered diverting conveyer positioned to receive lumber pieces diverted to said one side of said feed conveyer and constructed to produce travel of diverted pieces thereover away from said feed conveyer due to the action of gravity on such pieces, nonpower-actuated stack-forming means positioned to receive successive lumber pieces traveling over said diverting conveyer with such pieces collecting one on top of another and in a formed stack, said stack-forming means having one state effective to confine a stack with the latter below a certain size, and being switchable to another state effective to release the stack on the same reaching said certain size, switching of said stack-forming means from its said one to its said other states occurring due to the influence of gravity acting on a stack therein having said certain size, a nonpowered receiving conveyer disposed adjacent said stack-forming means positioned to receive a formed stack released from said stack-forming means and constructed to produce travel of the stack thereover away from the stack-forming means due to the action of gravity on the stack, and a receiving station fed formed stacks by said receiving conveyer for holding multiple ones of such stacks.

2. The apparatus of claim 1, wherein said stack-forming means comprises an enclosure for snugly enclosing a stack, said enclosure including an open top for admitting thereinto lumber pieces traveling over said diverting conveyor, and a swing wall mounted for swinging movement having one position with said stack-forming means in its said one state extending across and at least partially closing a side of the enclosure, and another position with the stack-forming means in its said other state to which it swings to open said side, and adjacent said enclosure there is nonpowered stack size-responsive means positioned to sense the size of a stack in said enclosure and operatively connected to said swing wall, operable to effect swinging of said wall toward said other position on sensing a stack in the enclosure having said certain size.

3. The apparatus of claim 2, wherein said stack-forming means comprises a nonpowered conveyer section having a raised position where it forms the base of said enclosure for supporting a stack of pieces formed in the enclosure, and a lowered position to which it moves under the influence of gravity acting on a stack supported thereby upon said stack size-responsive means sensing a stack in said enclosure having said certain size, and means interconnecting said swing wall and said conveyer producing swinging of the wall toward its said other position on movement of said conveyer section toward its lowered position.

4. The apparatus of claim 3, wherein said stack-forming means further includes nonpowered releasable locking means releasably locking said swing wall in its said one position, and said stack size-responsive means comprises a height-sensitive element operatively connected to said locking means engaged by a lumber piece entering said enclosure on a stack in the enclosure attaining a certain height, said element when so engaged causing said locking means to release said swing wall.

5. The apparatus of claim 4, which further comprises gravity-biased means operatively connected to said interconnecting means operable, with said swing wall in its said other position and said conveyer section in its said lowered position, and after transfer of a formed stack onto said receiving conveyer, to return the swing wall to its said one position and the conveyer section to its said raised position.

6. The apparatus of claim 5, wherein said releasable locking means includes a guide continuously engaging said swing wall with the latter swung away from its said one position, guiding the locking means to a position again releasably locking said swing wall in place on return swinging of the wall toward its said one position.

7. The apparatus of claim 3, wherein said conveyer section comprises a frame and nonpowered rollers rotatably mounted on the frame, said rollers, with the conveyer section in its raised position, defining a substantially horizontal stack support, and with the conveyer section in its lowered position, defining an inclined stack support producing travel of the stack along a path extending away from said enclosure due to the action of gravity on the stack.

8. The apparatus of claim 7, wherein, viewing said enclosure and conveyer section in plan, the longitudinal axis of the former extends at an oblique angle relative to the longitudinal axis of the latter.

9. The apparatus of claim 7, wherein said receiving conveyer comprises a frame and nonpowered rollers rotatably mounted on the frame, said rollers in said receiving conveyer defining an inclined path for the travel of a formed stack thereover which is a continuation of the travel path provided for a stack by the rollers in said conveyer section with the latter in its said lowered position.

10. The apparatus of claim 9 which forms part of a sorter that includes other associated diverting means and stack-forming means which are similar to the first-mentioned diverting and stack-forming means.

11. The apparatus of claim 1, wherein said diverting means comprises an elongated vertically-movable diverting member mounted above said feed conveyer with said member, when viewed in plan, having its longitudinal axis disposed at an angle relative to the path of travel for lumber pieces on the feed conveyer, said member having a raised position providing clearance for pieces traveling thereunder on said feed conveyer, and being movable to a lowered position where it engages a piece traveling on the feed conveyer to divert the piece to said one side of the conveyer.

12. In apparatus for conveying and stacking lumber pieces, a stack enclosure with an open top and walls distributed about a space for snugly enclosing a stack formed within the enclosure, means for conveying lumber pieces to said enclosure and for introducing them through said open top into said space, a nonpowered conveyer section having a raised position where it forms a substantially horizontal support adjacent the base of said enclosure for supporting a stack of pieces formed in said enclosure, said conveyer section being downwardly movable by gravity under the influence of a stack which has collected thereon to a lowered position effecting transfer of the stack away from the enclosure, nonpowered-actuated locking means having one condition releasably locking said conveyer section in its said raised position, and another position releasing the conveyer section, nonpower-actuated stack size-responsive means operatively connected to said locking means responsive to the size of a stack in said enclosure and operable on a stack therein reaching a certain size to place the locking means in its said other condition, said stack enclosure including at least one swing wall which is mounted for swinging movement and swings to open a side of the stack enclosure, and means interconnecting the conveyer section and swing wall whereby the swing wall swings to open up such side on downward movement of the conveyer section.

13. The apparatus of claim 12, wherein said stack size-responsive means comprises a height-sensitive element which is engaged by a lumber piece introduced into said enclosure on a stack in the enclosure attaining a certain height.

14. The apparatus of claim 12 which further comprises a nonpowered receiving conveyer positioned to receive a formed stack from said conveyer section with the latter in its said lowered position.

References Cited

UNITED STATES PATENTS

| 2,424,093 | 7/1947 | Harred. | |
| 2,569,011 | 9/1951 | Laprise | 198—188 |
| 2,789,709 | 4/1957 | Shields. | |
| 2,846,086 | 8/1958 | Norwood. | |
| 2,886,929 | 5/1959 | Villemont. | |
| 2,944,685 | 7/1960 | Nicolazzi. | |
| 3,164,271 | 1/1965 | McWilliams | 214—11 |
| 3,279,600 | 10/1966 | Lawson. | |
| 3,292,783 | 12/1966 | Quist et al. | |
| 3,361,272 | 1/1968 | Carroll. | |
| 3,382,966 | 5/1968 | Califano et al. | |

FOREIGN PATENTS 573,381  11/1945  Great Britain.

GERALD M. FORLENZA, Primary Examiner

ROBERT J. SPAR, Assistant Examiner

U.S. Cl. X.R.

198—188